(12) United States Patent
Wheatley et al.

(10) Patent No.: US 9,560,459 B2
(45) Date of Patent: Jan. 31, 2017

(54) MODULAR VOICE AMPLIFICATION SYSTEM FOR PROTECTIVE MASK

(71) Applicant: D. Wheatley Enterprises, Inc., Aberdeen, MD (US)

(72) Inventors: David Wheatley, Aberdeen, MD (US); Patrick Hulbert, Aberdeen, MD (US)

(73) Assignee: D. Wheatley Enterprises, Inc., Aberdeen, MD (US)

( * ) Notice: Subject to any disclaimer, the term of this patent is extended or adjusted under 35 U.S.C. 154(b) by 0 days.

(21) Appl. No.: 14/713,744

(22) Filed: May 15, 2015

(65) Prior Publication Data

US 2016/0021472 A1    Jan. 21, 2016

Related U.S. Application Data

(60) Provisional application No. 61/994,435, filed on May 16, 2014.

(51) Int. Cl.
| | |
|---|---|
| *H04R 19/04* | (2006.01) |
| *H04R 27/04* | (2006.01) |
| *A62B 18/02* | (2006.01) |
| *H04B 1/38* | (2015.01) |
| *H04B 1/46* | (2006.01) |
| *H04R 5/02* | (2006.01) |
| *H04R 1/02* | (2006.01) |

(Continued)

(52) U.S. Cl.
CPC .............. *H04R 27/04* (2013.01); *A62B 18/02* (2013.01); *H04B 1/38* (2013.01); *H04B 1/385* (2013.01); *H04B 1/46* (2013.01); *H04R 1/025* (2013.01); *H04R 5/02* (2013.01); *H04B 2001/3866* (2013.01); *H04R 2201/023* (2013.01); *H04R 2227/009* (2013.01)

(58) Field of Classification Search
CPC ... A62B 18/08; H04R 1/083; H04R 2201/023; H04R 1/025; H04R 1/08; H04R 1/02; H04B 1/385; H04B 2001/3866; H04B 5/06; A42B 3/14; A42B 3/30; H04M 1/05
USPC ......... 381/367, 344, 376, 385, 75, 110, 315, 381/364, 366, 375; 2/5; 455/575.2, 100, 455/404.1, 550.1, 575.1, 90.2, 90.3
See application file for complete search history.

(56) References Cited

U.S. PATENT DOCUMENTS

| | | |
|---|---|---|
| 4,901,356 A | 2/1990 | Bauer |
| 5,138,666 A | 8/1992 | Bauer et al. |

(Continued)

OTHER PUBLICATIONS

M50 Full Face Mask. Avon Protection. http://www.avon-proteciton.com/Military /m50.htm. Downloaded May 7, 2015.

(Continued)

*Primary Examiner* — Paul S Kim
*Assistant Examiner* — Norman Yu
(74) *Attorney, Agent, or Firm* — Whiteford, Taylor & Preston, LLP; Gregory M. Stone

(57) ABSTRACT

Disclosed is a modular voice amplification system for a protective mask that allows connection of a single amplifier assembly to masks of varying configurations through minimal adjustment of the system. Adapter plates in the form of mounting brackets are provided, each of which is configured for attachment to the single amplifier assembly, but is individually configured for attachment to protective masks of varying configurations through differing attachment mechanisms provided on each adapter plate.

15 Claims, 13 Drawing Sheets

(51) Int. Cl.
*H04B 1/3827* (2015.01)
*H04R 25/00* (2006.01)

(56) References Cited

U.S. PATENT DOCUMENTS

| | | | |
|---|---|---|---|
| 5,371,804 A * | 12/1994 | Bauer | H04R 1/083 381/344 |
| 5,428,688 A | 6/1995 | Becker et al. | |
| 5,463,693 A | 10/1995 | Birli et al. | |
| 6,121,881 A | 9/2000 | Bieback et al. | |
| 7,110,743 B2 | 9/2006 | Depew et al. | |
| 7,302,072 B2 * | 11/2007 | Skillicorn | H04R 1/08 128/201.19 |
| 7,394,905 B2 | 7/2008 | Miller et al. | |
| 7,457,427 B2 | 11/2008 | Birli et al. | |
| 2003/0224838 A1 | 12/2003 | Skillicorn et al. | |
| 2005/0213782 A1 | 9/2005 | Miller et al. | |
| 2006/0050917 A1 | 3/2006 | Skillicorn et al. | |
| 2006/0177084 A1 | 8/2006 | Skillicorn et al. | |
| 2006/0227982 A1 * | 10/2006 | Miranda | A42B 3/14 381/151 |
| 2008/0085679 A1 | 4/2008 | Fettig et al. | |

OTHER PUBLICATIONS

M50 JSGPM. Protecting Today's Warfighter With Tomorrow's Technology. Avon Protection. www.avon-protection.com Downloaded May 7, 2015.

"M53 NBC Mask enters service with US Special Operations Unit." Avon Protection. http://www.avon-proteciton.com/Press%20releases/m53-nbc-mask-enters-service-with-us-s . . . / Downloaded May 7, 2015.

M53 One Mask, All Missions. Avon Protection. www.avon-protection.com Downloaded May 7, 2015.

* cited by examiner

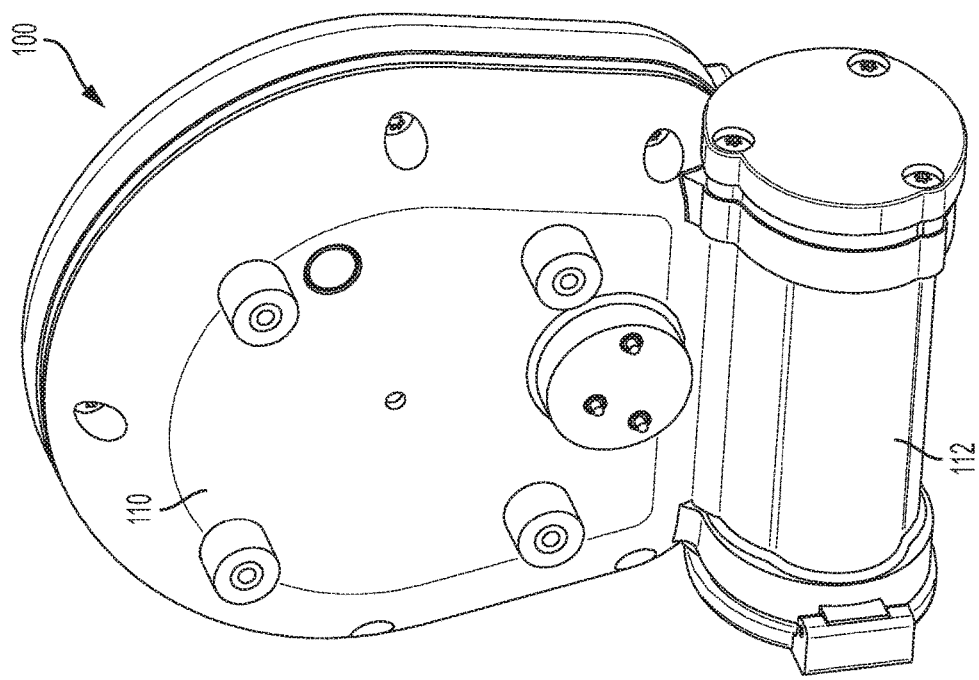
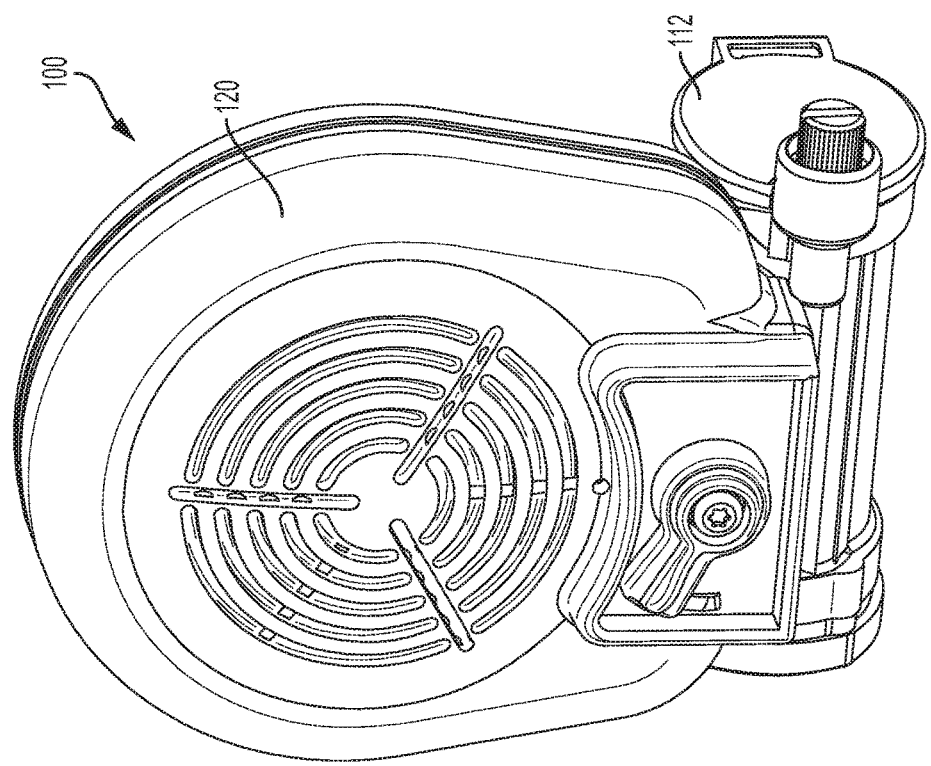

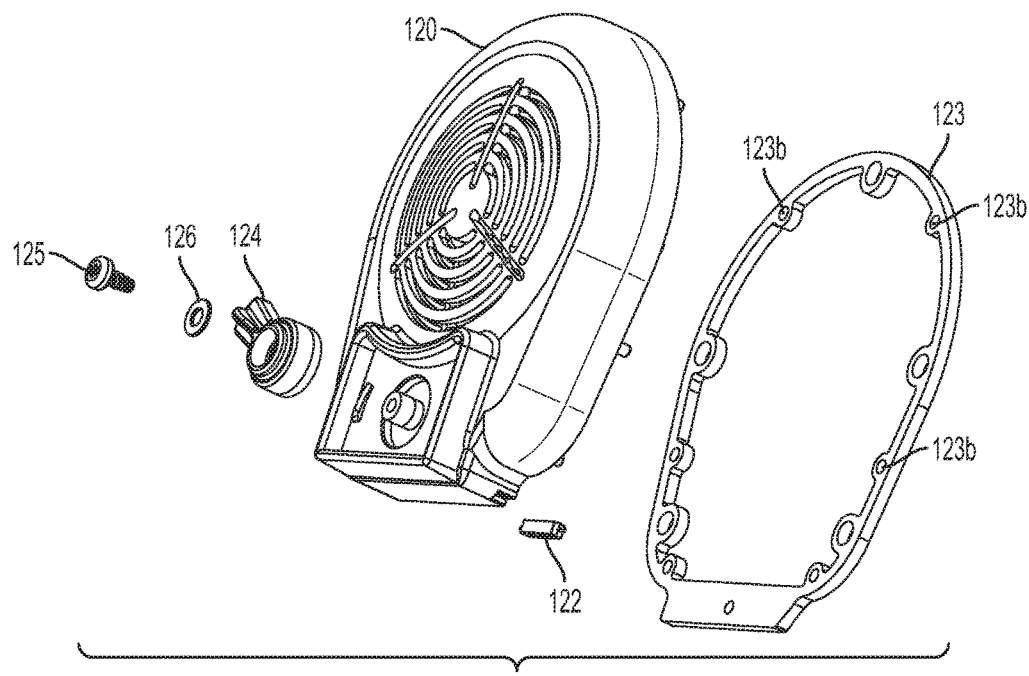
FIG. 4
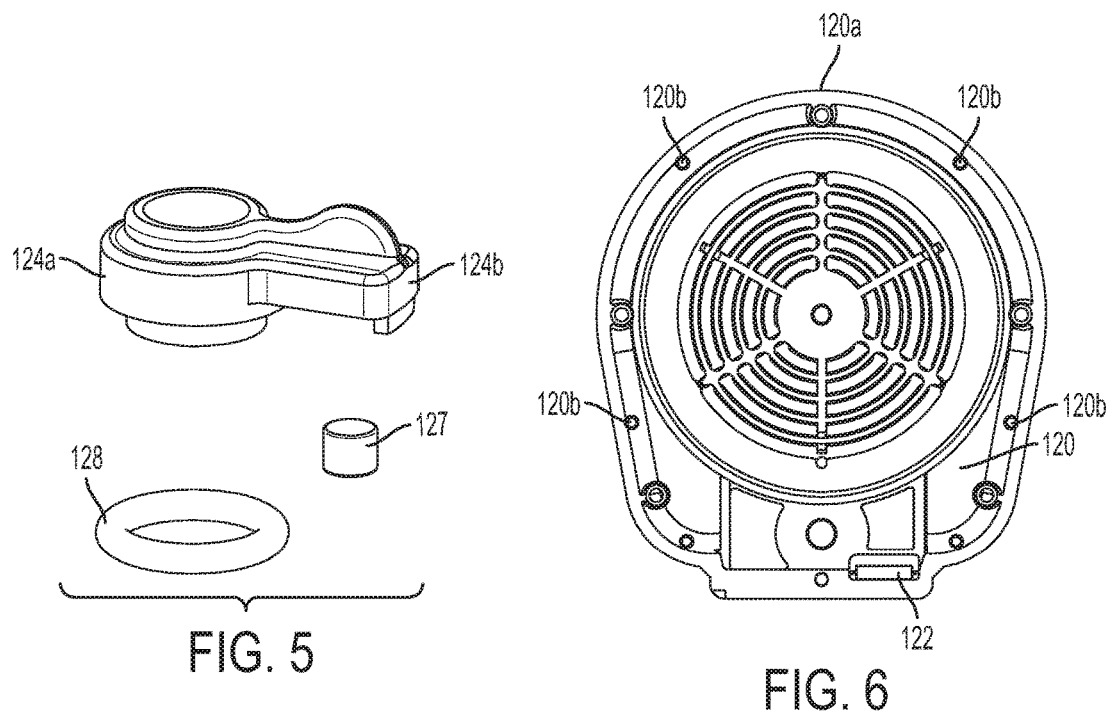
FIG. 5
FIG. 6

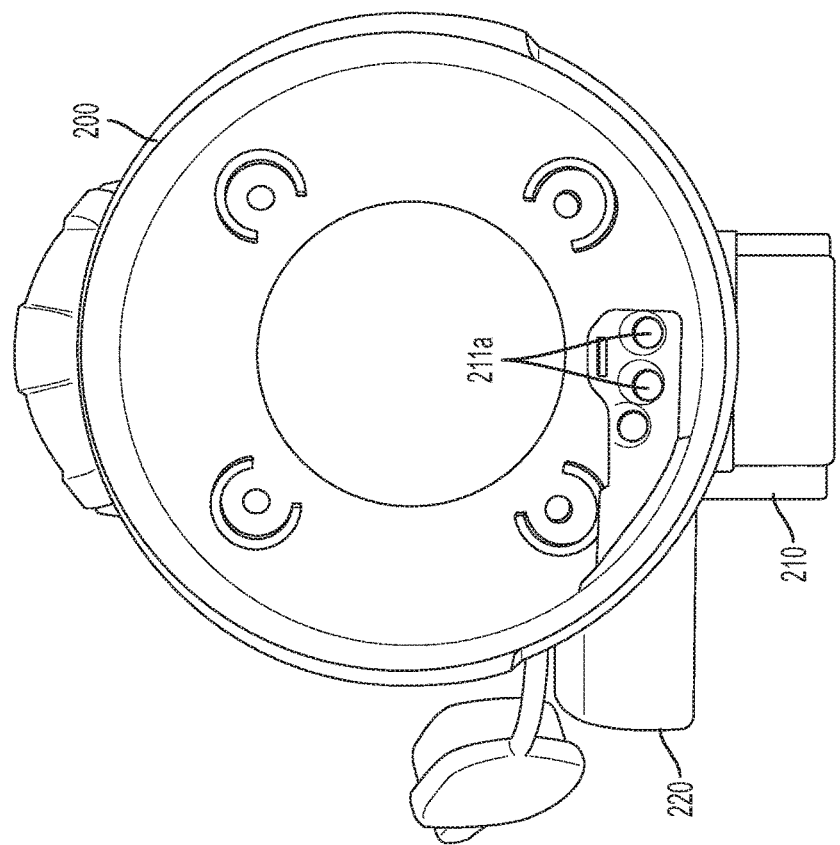
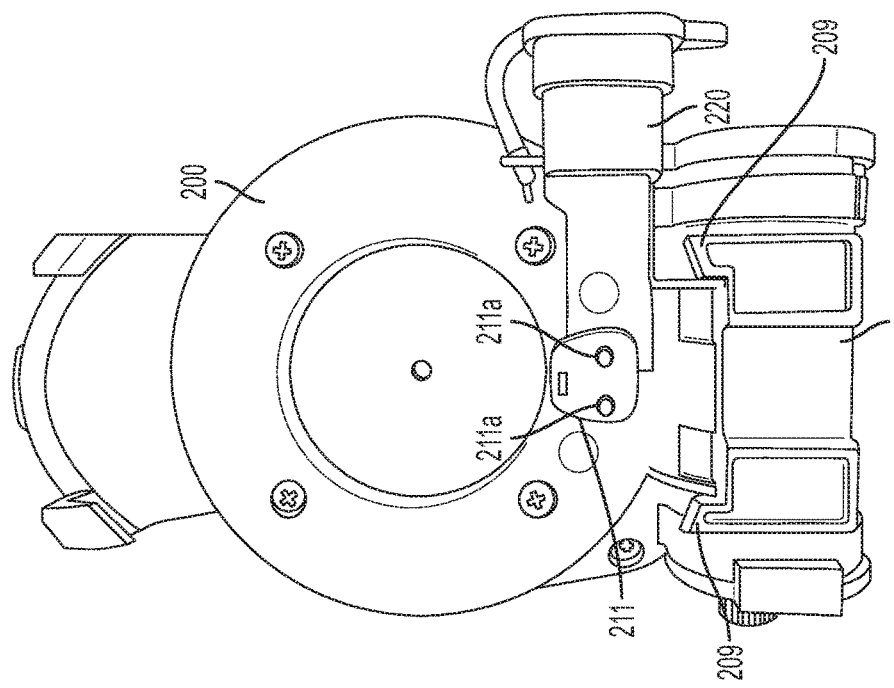

MODULAR VOICE AMPLIFICATION SYSTEM FOR PROTECTIVE MASK

CROSS-REFERENCE TO RELATED APPLICATIONS

This application is based upon and claims priority from U.S. Provisional Patent Application Ser. No. 61/994,435 entitled "Modular Voice Amplification System for Protective Mask," filed with the United States Patent and Trademark Office on May 16, 2014, the disclosure of which is incorporated herein by reference in its entirety.

FIELD OF THE INVENTION

This invention relates generally to communication systems for protective masks, and more particularly to a modular voice amplification system allowing connection of a voice amplifier to protective masks of varying configurations.

BACKGROUND OF THE INVENTION

Emergency personnel, persons tasked with working in hazardous environments, soldiers deployed in potentially hazardous contaminated environments, and the like are often supplied protective masks, such as gas masks, that provide a safe breathing environment for the operator in the adverse environment. Allowing such personnel to communicate can be critical to success of the mission in which they are operating. However, the protection afforded by typical protective masks can make such communication difficult, as the user's mouth is covered by the mask to prevent them from inhaling dangerous contaminants. Systems have therefore been provided to allow users wearing such protective masks to amplify their voice through an amplification device attached to the mask.

Unfortunately, however, masks can readily become damaged and require replacement given the harsh environments in which they are typically used. Moreover, as there are a variety of protective masks available to consumers of such products, there are likewise a wide variety of amplifiers available which are typically customized for a particular mask. In the event that a need arises to replace a mask that is equipped with a voice amplifier, the user must typically replace with the exact same mask model, or replace both the mask and the amplifier.

Moreover, while voice amplification systems have been provided that are mounted on the protective mask, such amplifiers can be large and bulky, heavy for the user, and impair the user's field of view through the protective mask.

It would therefore be advantageous to provide an amplifier that is of a more simplified, compact, and light-weight construction than previously available amplifiers so as to reduce both costs and burden that must be carried by the user, that is modular and compatible for use on masks of differing configurations, and that has a smaller physical footprint and is generally more easily worn and carried than previously available amplifiers.

SUMMARY OF THE INVENTION

Disclosed is a modular voice amplification system for a protective mask that allows connection of a single amplifier assembly to masks of varying configurations through minimal adjustment of the system. Adapter plates in the form of mounting brackets are provided, each of which is configured for attachment to the single amplifier assembly, but is individually configured for attachment to protective masks of varying configurations through differing attachment mechanisms provided on each adapter plate.

With regard to certain aspects of a particularly preferred embodiment, a modular voice amplification system is provided for a protective mask, comprising: a voice amplifier module having a front cover and a back cover, at least one electrical connector extending outward from the back cover, and a plurality of connector hubs extending outward from the back cover; a first mounting bracket comprising a first flat plate having a front side configured to sit flat against the back cover and having a plurality of openings configured to align with the plurality of connector hubs when the first flat plate is positioned against the back cover, a male electrical plug extending outward from a back side of the first mounting bracket and positioned for electrical connection to the at least one electrical connector on the voice amplifier module when the first flat plate is positioned against the back cover, and a plurality of retainer clips configured to removably attach the first mounting bracket to an exterior rim of a mouthpiece of a protective mask; and a second mounting bracket comprising a second flat plate having a front side configured to sit flat against the back cover and having a plurality of openings configured to align with the plurality of connector hubs when the second flat plate is positioned against the back cover, an electronics connection hub extending outward from a back side of the second mounting bracket and positioned for electrical connection to the at least one electrical connector on the voice amplifier module when the second flat plate is positioned against the back cover, an electrical cable extending from the electronics connection hub, and an electrical connector positioned at an end of the electrical cable, and a plurality of retainer clips configured to removably attach said second mounting bracket to an interior rim of a mouthpiece of a protective mask.

BRIEF DESCRIPTION OF THE DRAWINGS

The numerous advantages of the present invention may be better understood by those skilled in the art by reference to the accompanying drawings in which:

FIG. 2A is a front perspective view of a voice amplifier module for use with the system of FIG. 1.

FIG. 2B is a rear perspective view of the voice amplifier module of FIG. 2A.

FIG. 4 is an exploded view of a housing front cover of the voice amplifier module of FIGS. 2A and 2B.

FIG. 5 is an exploded view of a toggle switch assembly for use with the housing front cover of FIG. 4.

FIG. 6 is a rear view of the housing front cover of FIG. 4.

FIG. 15 is a rear view of the system of FIG. 1 configured for attachment to a protective mask in accordance with certain aspects of an embodiment of the invention.

FIG. 16 is a front view of a first mounting bracket for use with the system of FIG. 15.

DETAILED DESCRIPTION OF PREFERRED EMBODIMENTS

The following description is of a particular embodiment of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
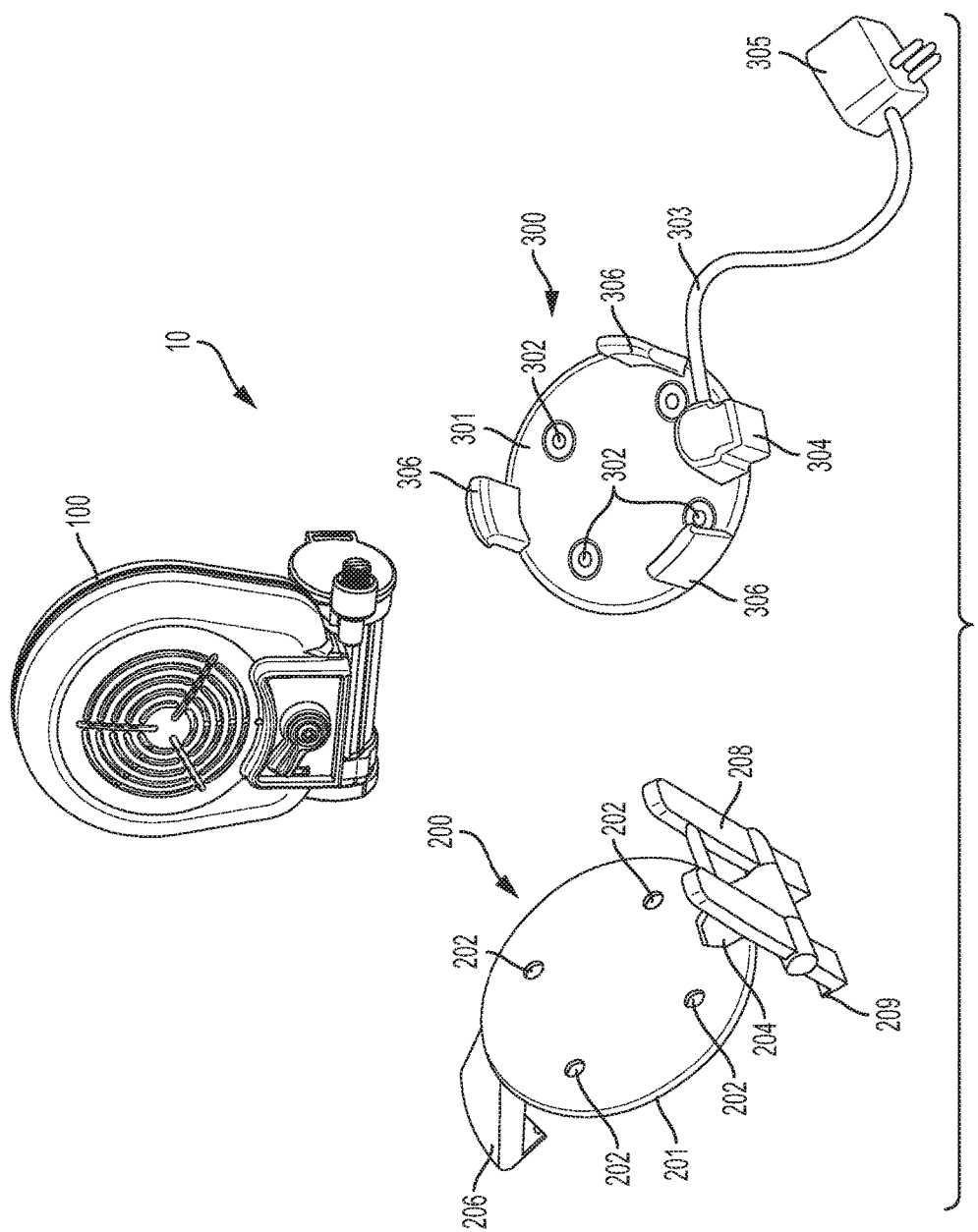
FIG. 1 is a perspective view of a modular voice amplification system for protective masks in accordance with certain aspects of an embodiment of the invention.

FIG. 1 shows a schematic view of a modular voice amplification system (shown generally at 10) for protective masks in accordance with certain aspects of an embodiment of the invention, including a voice amplifier module 100, a first mounting bracket 200 configured for attachment to voice amplifier module 100 and connection to a first protective mask, such as by way of non-limiting example an M50 or M51 protective mask (not shown), and a second mounting bracket 300 configured for attachment to voice amplifier module 100 and connection to a second protective mask having a configuration different from the first, such as by way of non-limiting example an M53 protective mask (not shown), each of which elements are discussed in further detail below.

As is known to those skilled in the art, the M50 and M53 masks have differing configurations, with the M50 having a configuration designated for use as a Joint Services General Purpose Mask, and the M53 having a configuration designated for use by Special Operations Units. While the construction of such masks and of previously known voice projection units that are attachable to such masks are well known to those of ordinary skill in the art, they are described briefly here. Voice projection units for the M50 mask configuration comprise a housing with a mask-facing side having an upper retainer clip that extends over the top edge of the mouthpiece, and a bottom, pivoting, spring-biased clip that extends over the bottom edge of the mouthpiece, with an electrical plug configured for insertion into an electrical receptacle on the front of the mouthpiece. Likewise, voice projection units for the M53 mask configuration comprise a housing with a mask-facing side having a plurality of fixed clips positioned along the circumference of the mask-facing side, which clips fit within the circular rim of the mouthpiece opening of the mask, and a cable extending to an electrical plug that mates with a socket on a lower portion of the mask. Given the varied configurations of such masks, it is impossible to utilize a voice projection unit configured for attachment to an M50 mask with an M53 mask, and it is likewise impossible to utilize a voice projection unit configured for attachment to an M53 mask with an M50 mask.

The system provided in FIG. 1, however, provides a single voice amplifier module 100 that may be attached to either an M50 mask or an M53 mask through simple selection of the appropriate mounting bracket 200, 300, and may be switched from an M50 mask to an M53 mask (and vice versa) through simple replacement of one of the mounting brackets 200, 300 with the other.

FIG. 2A shows a front perspective view of voice amplifier module 100, and FIG. 2B shows a back perspective view of voice amplifier module 100. As shown in FIGS. 2A and 2B and in the exploded view of voice amplifier module 100 of FIG. 3, voice amplifier module 100 includes a housing back cover 110, a housing front cover 120, and a printed circuit board ("PCB") and speaker assembly 130 (shown in FIG. 3) positioned between housing back cover 110 and housing front cover 120. Housing back cover 110 is attached to housing front cover 120 via preferably one or more threaded connectors 102, such as screws or the like, with PCB/speaker assembly 130 positioned between them. Moreover, PCB/speaker assembly 130 is preferably attached to an inner face of housing front cover 120 by applying a sealant, such as a polyurethane potting compound, applied at location 104 around the outer circumferential edge of PCB/speaker assembly 130 and an interior rim surface of housing front cover 120. Housing back cover 110 also preferably includes a battery compartment 112 configured to hold batteries that power PCT/speaker assembly 130.

Optionally, a tuning port 119 may be provided on the back face of back cover 110, allowing access to PCT/speaker assembly 130 to allow a user to make adjustments to that assembly, and a removable tuning port plug 114 may be positioned within the tuning port when not in use.

FIG. 4 shows an exploded view of housing front cover 120. As shown in FIG. 4, attached to the front side of housing front cover 120 are a toggle switch assembly 124 and a screw 125 and washer 126 connecting the toggle switch assembly 124 to the front of housing front cover 120. A reed switch subassembly 122 is mounted to the interior side of housing front cover 120. As shown in the exploded view of toggle switch assembly 124 of FIG. 5, toggle switch assembly 124 includes a generally cylindrical hub portion 124a and an arm 124b extending radially outward from hub portion 124a. Arm 124b may have a hollow underside configured to receive a magnet 127, and an O-ring 128 may be provided at the base of hub portion 124a to provide a seal between toggle switch 124 and the front of housing front cover 120. Reed switch subassembly 122 is positioned on the interior side of housing front cover 120 so that, as toggle switch 124 is rotated by the user, magnet 127 comes into and out of alignment with reed switch subassembly 122, in turn allowing power to flow or to stop power from flowing from battery compartment 112 to PCB and speaker assembly 130.

While the electrical connections between battery compartment 112 and reed switch subassembly 122 and between reed switch subassembly 122 and PCB and speaker assembly 130 are not particularly shown, such electrical connections are commonplace, are well known to those of ordinary skill in the art, and may readily be provided in varying configurations as may be desirable for varying embodiments of the invention without departing from the spirit and scope of the invention.

With continuing reference to FIG. 4, a voice amplifier gasket 123 is provided and is compressed between the outer peripheral edges of housing front cover 120 and housing back cover 110 when the two are joined together to further assist in creating a sealed environment within voice amplifier module 100. As shown in the rear view of housing front cover 120 of FIG. 6, an outer peripheral edge 120a of the underside of housing front cover 120 defines a seat for voice amplifier gasket 123, and a plurality of positioning pins 120b extending outward from such peripheral edge of the underside of housing front cover 120 align with openings 123b in voice amplifier gasket 123 to properly align gasket 123 between housing front cover 120 and housing back cover 110.

Figure 3:
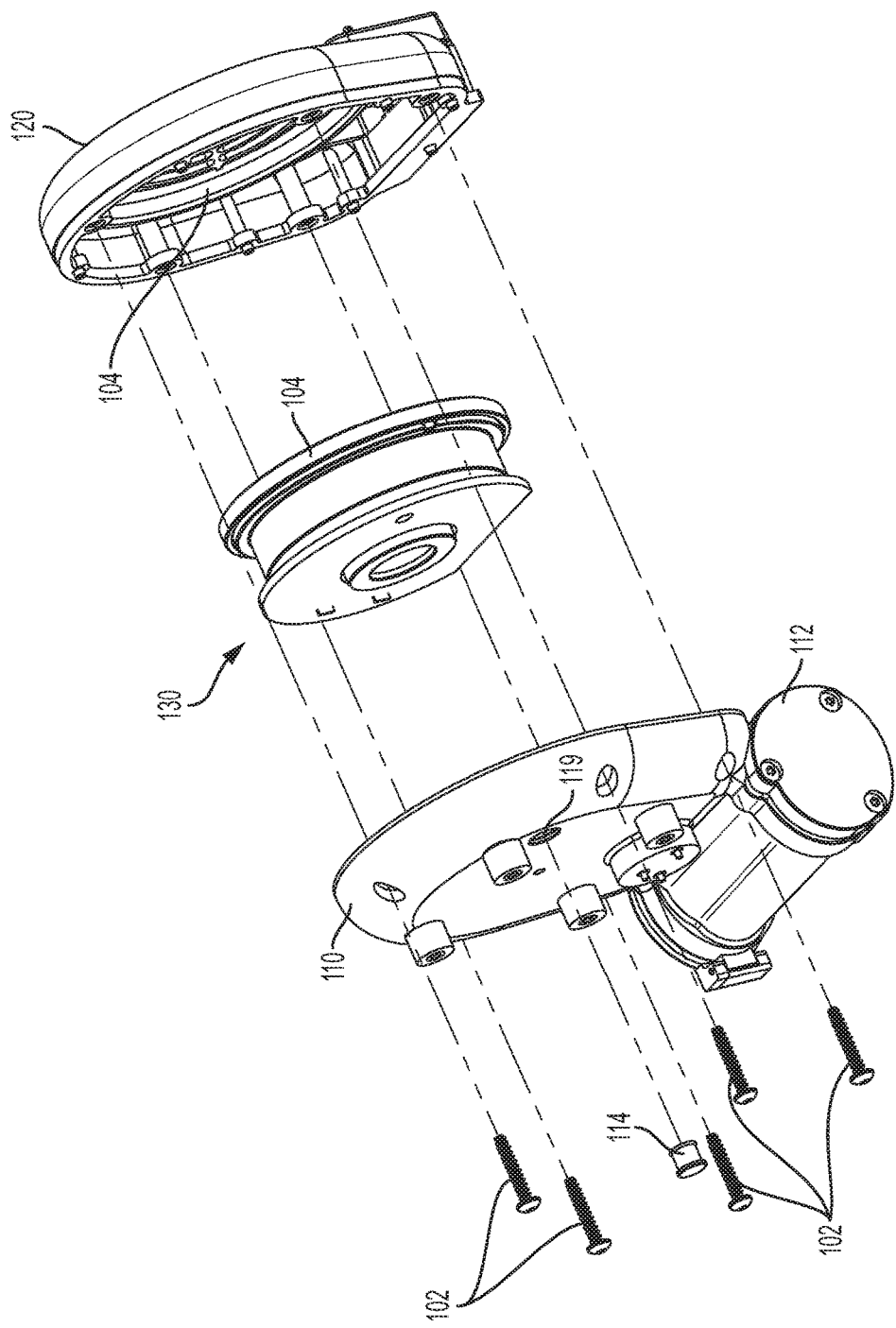
FIG. 3 is an exploded view of the voice amplifier module of FIGS. 2A and 2B.
Figure 7:
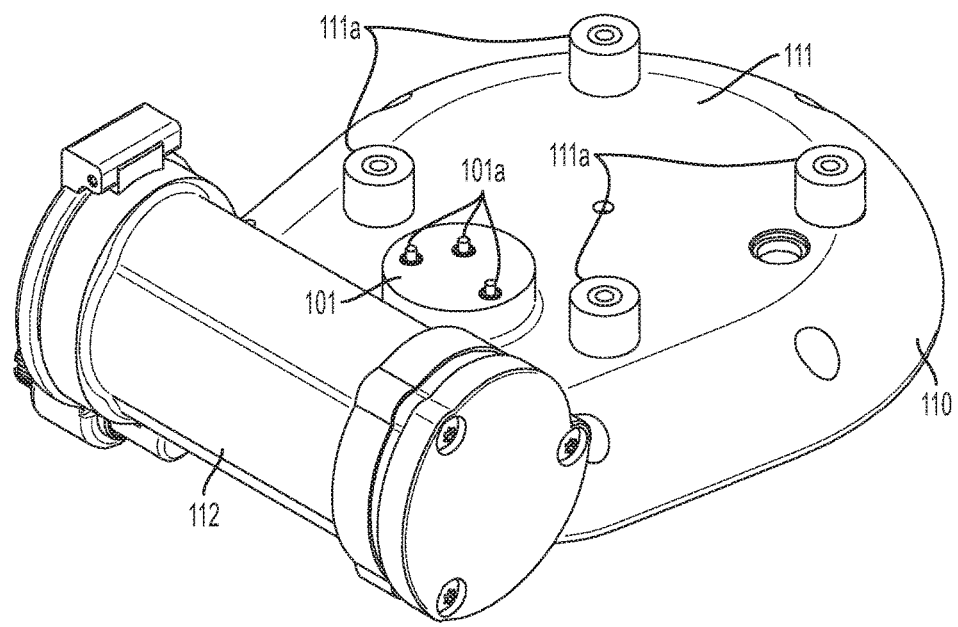
FIG. 7 is a perspective view of a housing back cover of the voice amplifier module of FIGS. 2A and 2B.
Figures 8, 9:
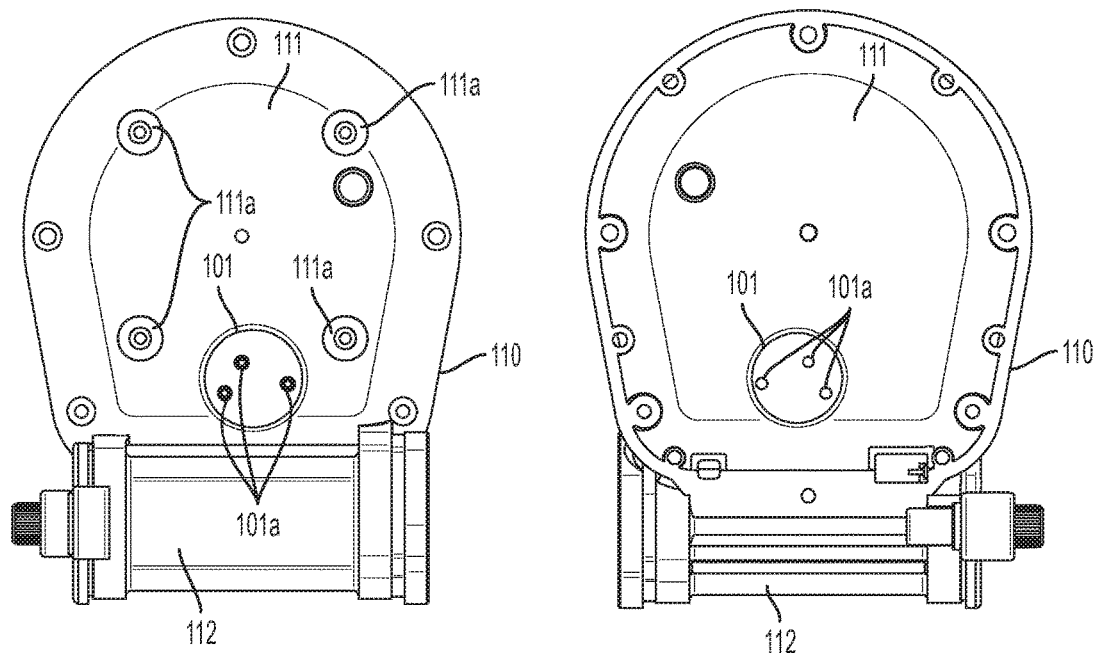
FIG. 8 is a rear view of the housing back cover of FIG. 7.
FIG. 9 is a front view of the housing back cover of FIG. 7.

Next, FIG. 7 shows a perspective view of housing back cover 110, FIG. 8 shows a back view of housing back cover 110, and FIG. 9 shows a front view of the interior of housing back cover 110. Housing back cover 110 includes a generally planar back wall portion 111 having a plurality of connector hubs 111a positioned on the back wall portion 111. Connector hubs 111a are configured to receive and properly orient first mounting bracket 200 and second mounting bracket 300 against housing back 110 when it is desired to attach the modular voice amplification system to a protective mask, as discussed in greater detail below. Connector hubs 111a are configured to receive threaded connectors 102 (as shown in FIG. 3) which extend through housing back cover 110 and into internally threaded sleeves on the interior of housing front cover 120 to secure housing back cover 110 to housing front cover 120. An electrical connector housing 101 is positioned at the base of back wall portion 111, and has one or more electrical connectors 101a exposed to the outside of housing back cover 110 to provide an electrical connection between voice amplifier module 100 and one of first mounting bracket 200 and second mounting bracket 300, which in turn establish electrical connection with the communications electronics (e.g., a microphone) positioned within the mask to which voice amplifier module 100 is attached. Once again, the particular internal connections between electrical connectors 101a and PCB and speaker assembly 130 are not critical to the invention and may be configured as design constraints may suggest to those of ordinary skill in the art for varying configurations of the invention.

In certain configurations, electrical connectors 101a may establish a direct electrical connection with the communications electronics positioned within the mask, without first passing through electrical connections on one of first mounting bracket 200 and second mounting bracket 300.

As shown in FIGS. 7 through 9, battery compartment 112 is positioned generally along the bottom portion of planar back wall portion 111 and extends rearward from planar back wall portion 111. This positioning of battery compartment 112 lowers the center of gravity of modular voice amplification system 10, which in turn makes the modular voice amplification system easier to carry and more comfortable for long-term wear by a user.

Figure 10:
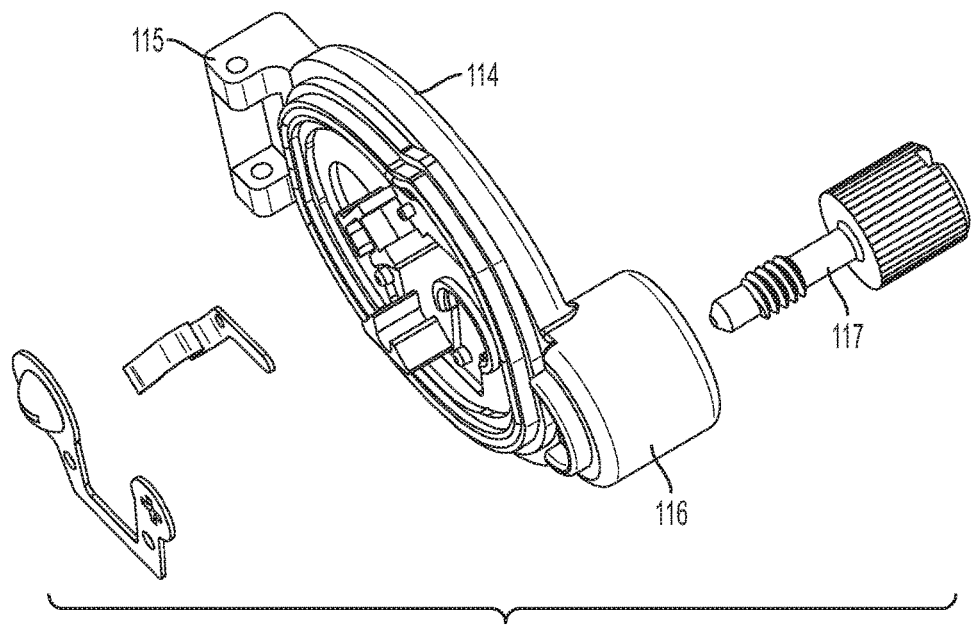
FIG. 10 is an exploded view of a battery compartment cover for use with the voice amplifier module of FIGS. 2A and 2B.
Figure 11:
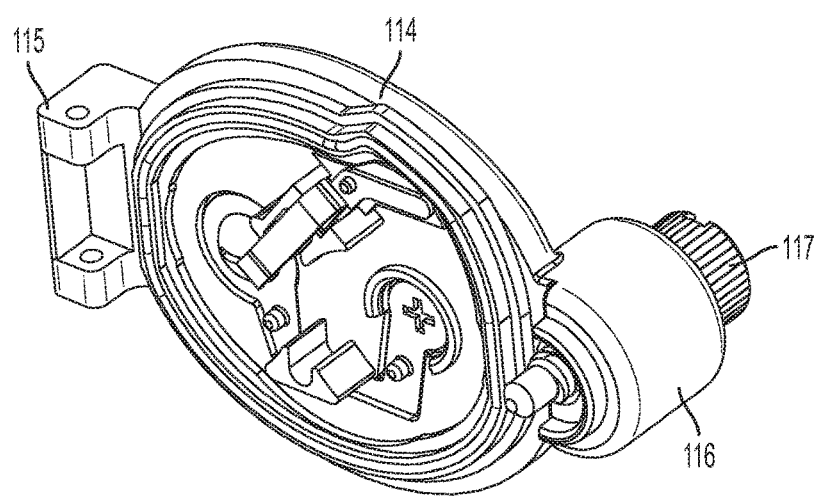
FIG. 11 is an assembled view of the battery compartment cover of FIG. 10.

FIG. 10 shows an exploded view and FIG. 11 an assembled view of a cover 114 suitable for use with battery compartment 112. Battery compartment cover 114 preferably includes a hinge member 115 allowing cover 114 to be hingedly connected to battery compartment 112 on housing back 110. Further, a screw housing 116 is positioned along an outer edge of the cover 114, and receives a threaded member 117 therethrough that holds battery cover 114 closed over battery compartment 112 when threaded member 117 is tightened. The inner side of battery cover 114 includes battery contacts as are known to those of ordinary skill in the art. Moreover, battery compartment 112 is configured to receive one or more removable batteries for powering the modular voice amplification system 10 in an internal configuration standard for portable electronically powered devices.

Figure 12:
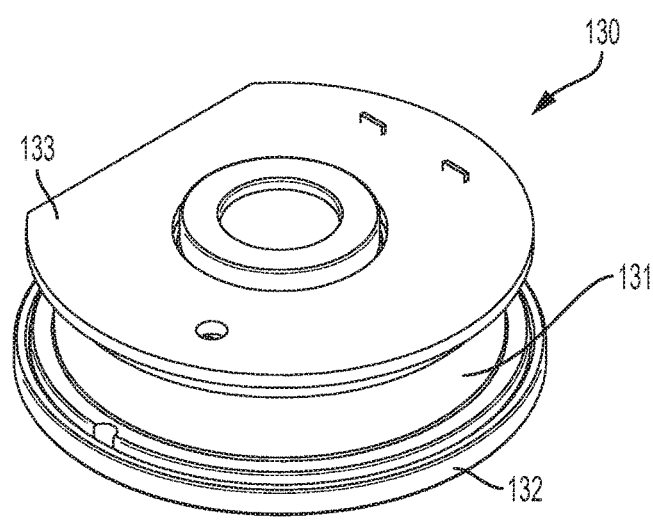
FIG. 12 is an assembled view of a PCB and speaker assembly for use with the voice amplifier module of FIGS. 2A and 2B.
Figure 13:
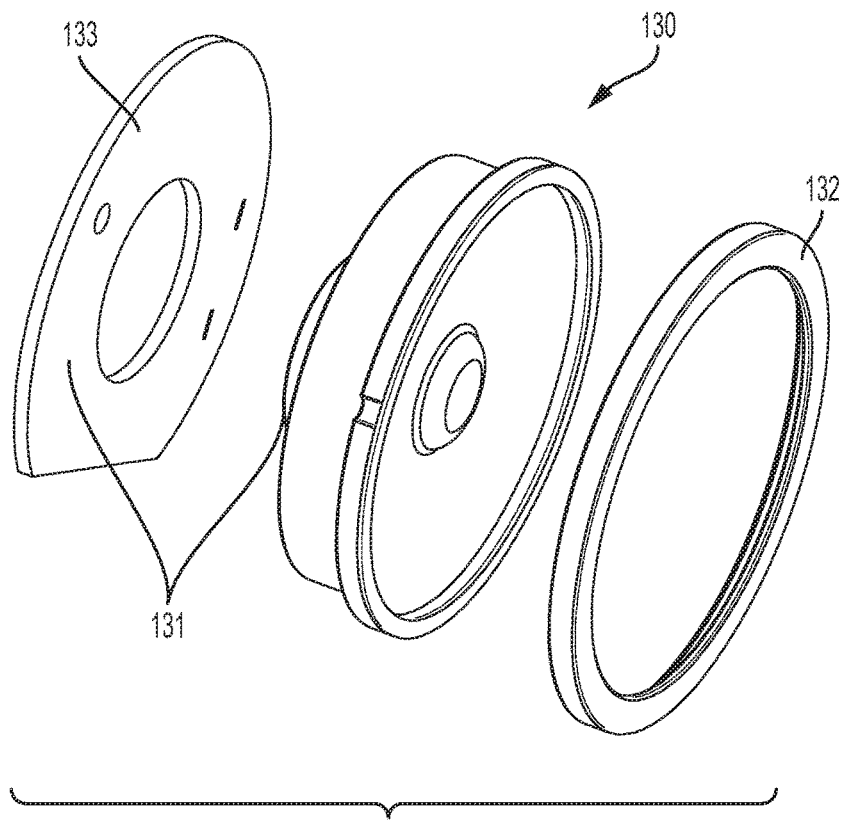
FIG. 13 is an exploded view of the PCB and speaker assembly of FIG. 12.

FIG. 12 provides an assembled view, and FIG. 13 an exploded view, of PCB/speaker assembly 130. PCT/speaker assembly 130 includes a speaker 131, a speaker gasket 132 that sits between the front of speaker 131 and the interior of housing front cover 120 and that seals the interior of voice amplifier module 100, and printed circuit board 133 soldered to and forming an electrical connection with speaker 131. While not shown in detail in the Figures, those of ordinary skill in the art will recognize that electrical connections are likewise provided on PCB 133 to electrically communicate PCB 133 with electrical connectors 101a on housing back cover 101 so as to direct electrical signals from electronics within the user's mask (e.g., a microphone) to speaker 131.

In embodiments of the invention, a cellular telephone or other wireless communications device may also be integrated into voice amplifier assembly 100, as well as a radio interface allowing connection with a user's radio, such as by providing additional wired or wireless connections and processors on PCB 133. Similarly, PCB 133 may be provided with a processor that implements a push-to-talk functionality, allowing the wearer to wirelessly communicate using voice amplifier module 100 through manual operation of a switch (not shown) in electrical communication with PCB 133, using push-to-talk telecommunications processing equipment well known to those of ordinary skill in the art and adapted for packaging within voice amplifier module 100.

Next, and with reference again to FIG. 1, first mounting bracket 200 is configured for attachment to voice amplifier assembly 100 and connection to a first protective mask, such as by way of non-limiting example an M50 or M51 protective mask. Mounting bracket 200 has a round plate 201 having openings 202 that align with connector hubs 111a on the back wall 111 of housing back 110, thus ensuring proper alignment of mounting bracket 200 with modular voice amplifier assembly 100. Plate 201 is configured to sit flush against back wall 111 of housing back 110 so as to minimize the overall profile of voice amplifier module 100 when connected to an M50 or M51 mask. In certain configurations, an electronics connection opening 204 is provided at the base of plate 201 and is configured to receive electrical connector housing 101 on the housing back cover 110 of voice amplifier module 100, such that the electrical connectors 101a may connect directly to electronics on the protective mask. A retainer clip 206 is positioned at the top of plate 201, and is configured with a downwardly extending lip for attachment to the front of a protective mask, such as an M50 or M51 mask, over the top edge of the mouthpiece of the mask. Likewise, in the configuration shown in FIG. 1, a rocker arm assembly 208 may be pivotably connected to the bottom of plate 201. Rocker arm assembly 208 may have one or more upwardly extending tabs 209 for attachment to the front of the protective mask, and may pivot into and away from engagement with a lower portion of the front of a protective mask (e.g., over the bottom edge of the mouthpiece of the mask), thus providing a means by which the modular voice amplification system may be readily detached from the mask. In this configuration, rocker arm assembly 208 is preferably spring biased so that the mask-engaging portion of rocker arm assembly 208 is biased upward and into engagement with the mask so as to avoid inadvertent disconnection from the mask.

Figure 14:
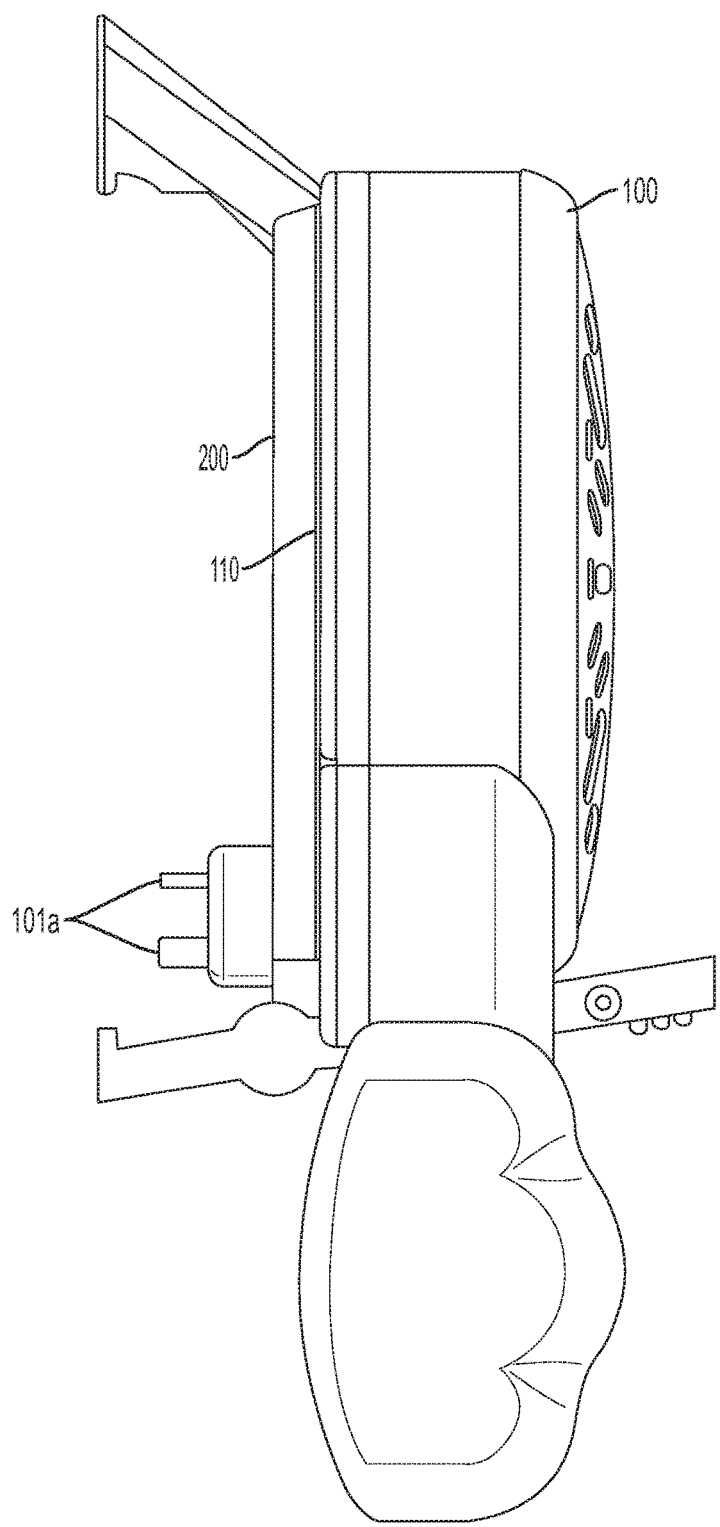
FIG. 14 is a side view of the system of FIG. 1 configured for attachment to a protective mask in accordance with certain aspects of an embodiment of the invention.

FIG. 14 provides a side view of the modular voice amplification system with first mounting bracket 200 (configured as discussed above with regard to FIG. 1) positioned on the housing back cover 110 of the voice amplifier module 100. As shown in FIG. 14, in this configuration, electrical connectors 101a form a male plug configured for direct engagement with a socket on the front mouthpiece of an M50 or M51 mask, thereby providing direct electrical communication between electronics within the user's mask and the PCB and speaker assembly 130 of the voice amplifier module 100.

In accordance with further aspects of an embodiment of the invention, first mounting bracket 200 may be configured as shown in FIG. 15, in which mounting bracket 200 has an electrical connector housing 211 having its own electrical connectors 211a forming a male plug configured for direct engagement with a socket on the front mouthpiece of an M50 or M51 mask. As shown in the front view of the underside of first mounting bracket 200 of FIG. 16, electrical connectors 211a are exposed to the underside of mounting bracket 200 to allow electrical connection with electrical connectors 101a of electrical connector housing 101 on the housing back cover 110. Optionally, a secondary electrical connector 220 may also be provided in the form of a female receptacle allowing the attachment of further electronic devices, such as wireless telecommunications equipment, push-to-talk equipment, and other ancillary devices as will be envisaged by those of ordinary skill in the art for integration and/or combination with the voice amplification functions of PCB and speaker assembly 130. Further, and as particularly shown in the configuration of FIGS. 15 and 16, upwardly extending tabs 209 that are configured to engage the bottom of a mouthpiece on the mask need not be attached to a rocker arm, but may be simply mounted to a semi-flexible connector plate 210 that may be integrally formed with mounting bracket 200, but may nonetheless pivot with respect to the rest of mounting bracket 200 given the inherent flexibility of the plastic of the assembly, so as to allow the wearer to manually bend such connector plate 210 to move upwardly extending tabs 209 out of engagement with the front of the wearer's mask for removal of voice amplifier module 100 from the mask.

Likewise, and again with reference to FIG. 1, second mounting bracket 300 is configured for attachment to voice amplifier assembly 100 and connection to a second protective mask having a different front configuration from the first protective mask, such as by way of non-limiting example an M53 protective mask. Mounting bracket 300 has a round plate 301 having openings 302 that align with connector hubs 111a on the back wall 111 of housing back 110, thus ensuring proper alignment of mounting bracket 300 with modular voice amplifier assembly 100. Plate 301 is configured to sit flush against back wall 111 of housing back 110. An electronics connection hub 304 is provided at the base of plate 301 and is configured to form an electrical connection with electrical connector 101 on the housing back cover 110 of modular voice amplifier assembly 100. An extended electrical connector 305 is attached to electronics connection hub 304 via an electrical cable 303, which connector 305 forms a male plug that may then connect directly to an electrical outlet on the protective mask. A plurality of retainer clips 306 are positioned about the circumference of plate 301, and are configured for attachment to the front of a protective mask, such as an M53 mask. At least some of retainer clips 306 may have sufficient flexibility with respect to plate 301 so as to allow them to flex to enable detachment from the mask, but are likewise preferably sufficiently rigid so as to hold the modular voice amplification system on the mask until it is intentionally removed.

Figure 18:
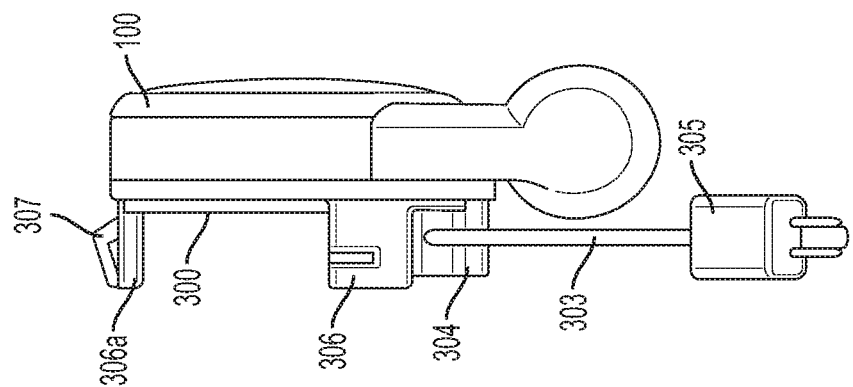
FIG. 18 is a side view of the system of FIG. 17.
Figure 17:
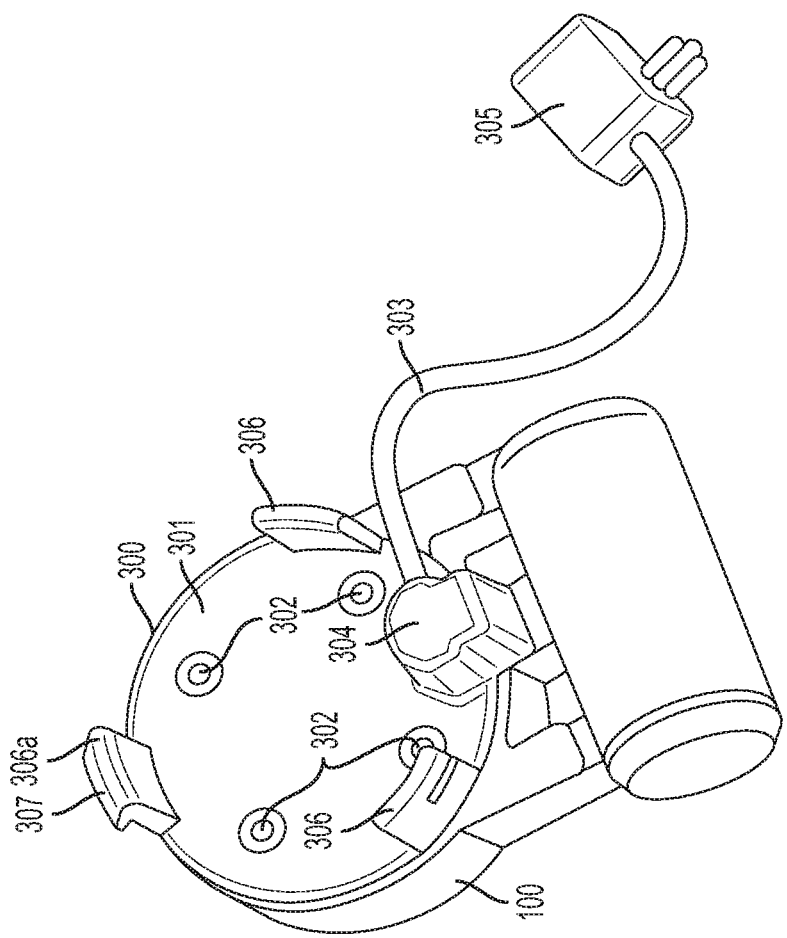
FIG. 17 is a rear perspective view of the system of FIG. 1 configured for attachment to a protective mask in accordance with further aspects of an embodiment of the invention.
Figure 19:
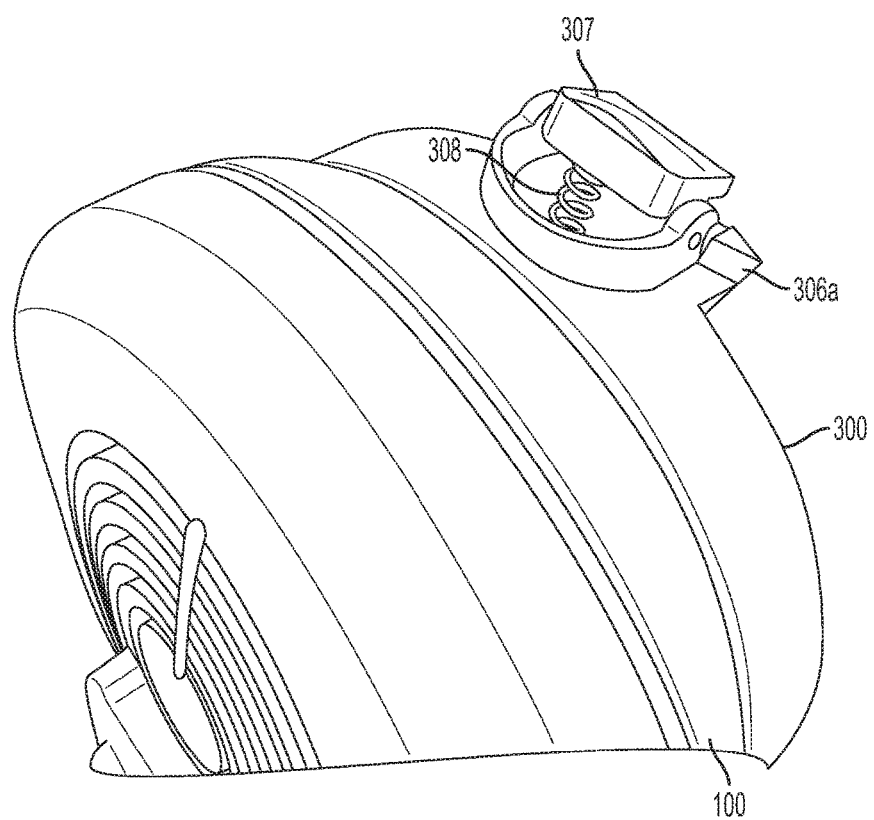
FIG. 19 is a close-up, top perspective view of the system of FIG. 17.

As shown in the perspective view of FIG. 17 and in the side view of FIG. 18, an uppermost retainer clip 306a may have a pivotably connected attachment tab 307 that may lock uppermost retainer clip 306 against a portion of the front of the protective mask until the attachment tab 307 is pivoted out of engagement with the front of the mask. FIG. 19 provides a close-up perspective view of uppermost retainer clip 306a, viewed from the front side of voice amplifier module 100 (i.e., the side opposite the wearer's mask). Attachment tab 307 of uppermost retainer clip 306a is spring biased (for example, by way of a coil spring 308) into engagement with the exterior of the rim of the mouthpiece on the front of the wearer's mask, while the clip portion 306a to which the tab 307 is pivotably connected engages the interior of the rim of the mouthpiece. In this configuration, removal of voice amplifier module 100 may be achieved by simply depressing tab 307 to disengage the uppermost retainer clip 306a from the mask, and thereafter pivoting the voice amplifier module 100 away from the mask.

Figure 20:
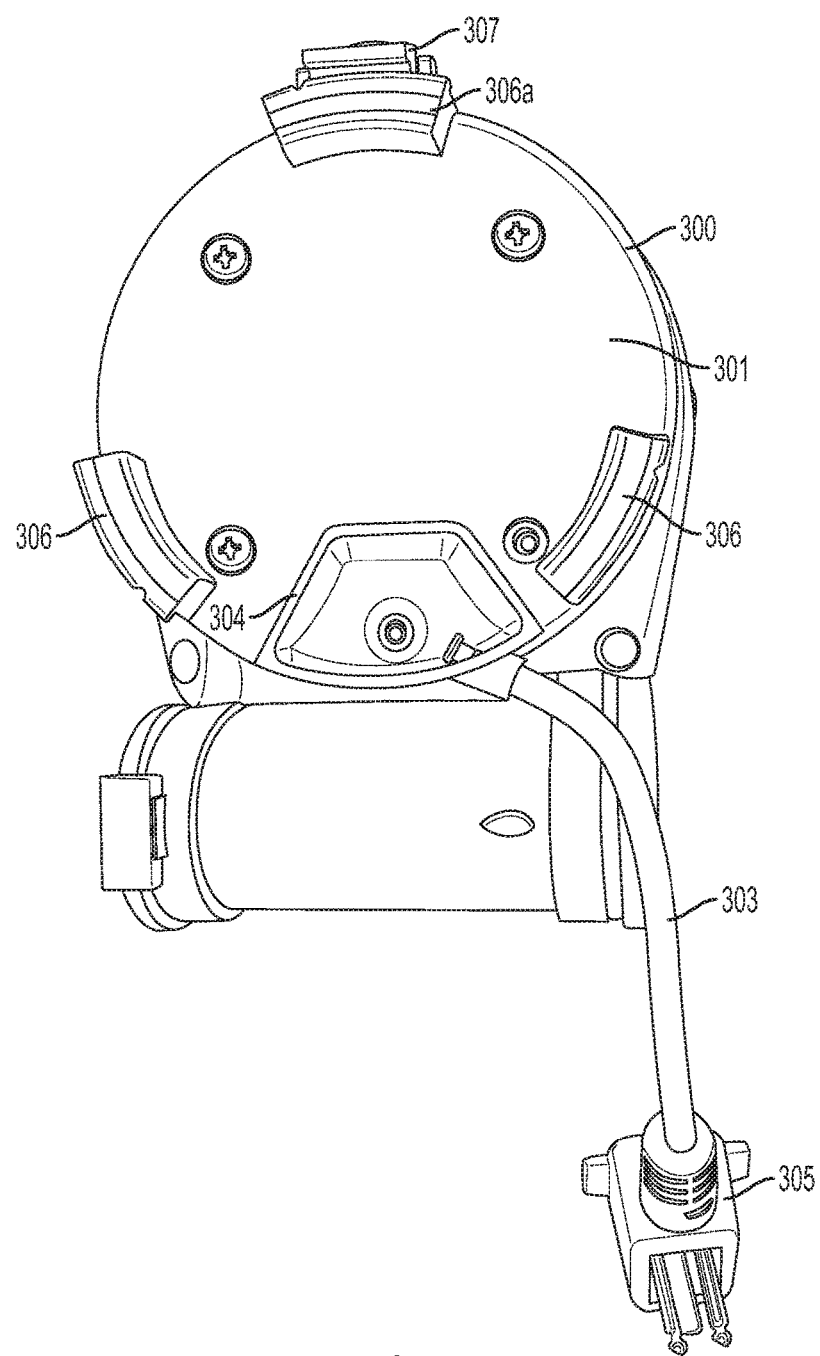
FIG. 20 is a rear view of the system of FIG. 17.
Figure 21:
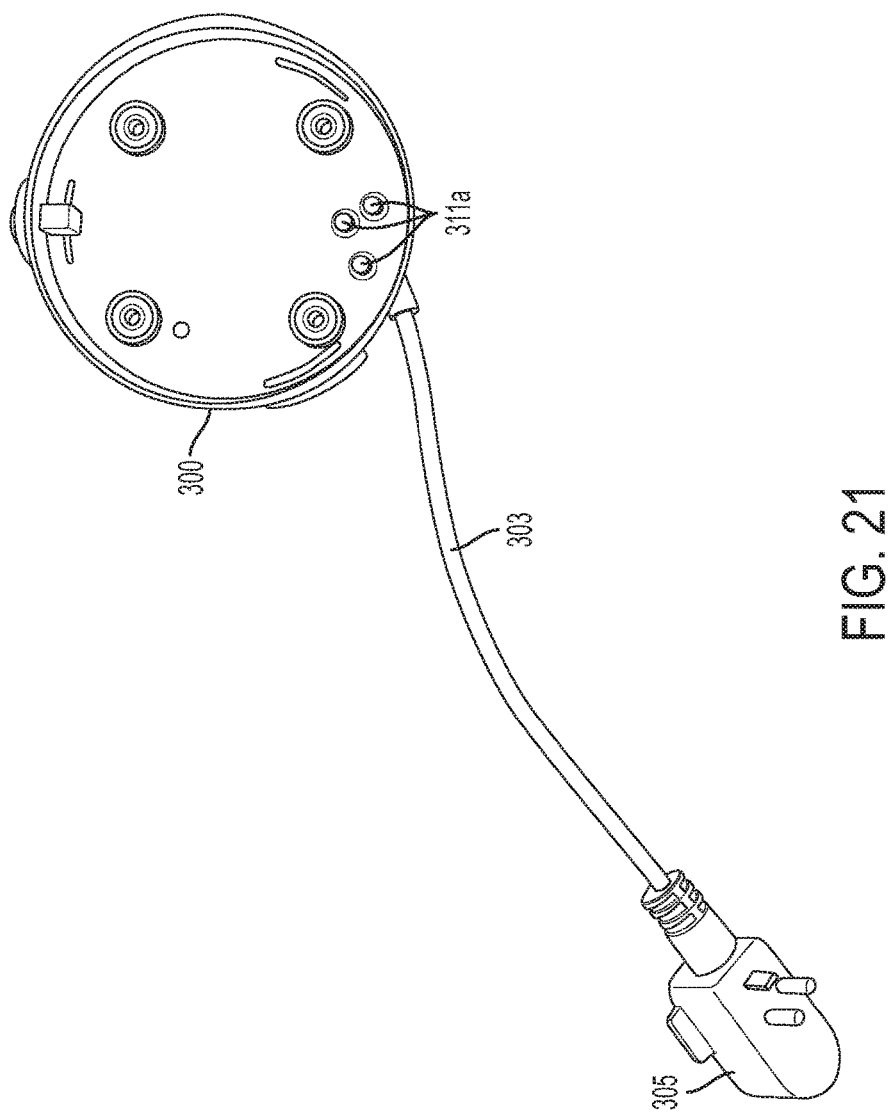
FIG. 21 is a front view of a second mounting bracket for use with the system of FIG. 17.

FIG. 20 provides a back view of second mounting bracket 300 attached to voice amplifier module 100, while FIG. 21 shows a front view of the underside of second mounting bracket 300. As shown in FIG. 21, electrical connectors 311a are exposed to the underside of mounting bracket 300 to allow electrical connection between electrical connectors 101a of electrical connector housing 101 on the housing back cover 110 and extended electrical connector 305.

With particular reference to FIGS. 17, 18, and 20, electronics connection hub 304 has a minimal vertical profile, such that it extends upward from round plate 301 by only a small amount, and in any case less than the distance by which retainer clips 306 extend outward from round plate 301. This allows proper fitment of the modular voice amplification system 10 against the front mouthpiece portion of a M53 mask so as to minimize the profile of the system 10 and avoid interference with the wearer's line of sight.

The voice amplification system 10 configured as described above allows an operator to readily adapt their voice amplifier module to protective masks of varying configurations. For instance, if an operator must change their particular mission from one requiring, by way of example, an M50 or M51 mask, to one requiring, again by way of example, an M53 mask, they may do so without replacement of the more complex and expensive electronic assembly within the voice amplifier module by simply detaching the system 10 from their mask, removing the currently attached mounting bracket 200 or 300, and replacing such bracket with the alternative bracket 300 or 200, respectively, and reattaching the system to the new mask, without need for resupply of a new voice amplifier unit.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A modular voice amplification system for a protective mask, comprising:
   a voice amplifier module having a front cover and a back cover, at least one electrical connector extending outward from said back cover, and a plurality of connector hubs extending outward from said back cover;
   a first mounting bracket comprising:
      a first flat plate having a front side configured to sit flat against said back cover and having a plurality of openings configured to align with said plurality of connector hubs when said first flat plate is positioned against said back cover;
      a male electrical plug extending outward from a back side of said first mounting bracket and positioned for electrical connection to said at least one electrical connector on said voice amplifier module when said first flat plate is positioned against said back cover; and
      a plurality of retainer clips configured to removably attach said first mounting bracket to an exterior rim of a mouthpiece of a protective mask; and
   a second mounting bracket comprising:
      a second flat plate having a front side configured to sit flat against said back cover and having a plurality of openings configured to align with said plurality of connector hubs when said second flat plate is positioned against said back cover;
      an electronics connection hub extending outward from a back side of said second mounting bracket and positioned for electrical connection to said at least one electrical connector on said voice amplifier module when said second flat plate is positioned against said back cover, an electrical cable extending from said electronics connection hub, and an electrical connector positioned at an end of said electrical cable; and
   a plurality of retainer clips configured to removably attach said second mounting bracket to an interior rim of a mouthpiece of a protective mask.

2. The modular voice amplification system of claim 1, said plurality of retainer clips on said first mounting bracket further comprising:
   a fixed retainer clip extending from an upper edge of said first flat plate and outward from said back side of said first flat plate; and
   at least one engagement tab movably mounted to said first mounting bracket.

3. The modular voice amplification system of claim 1, said plurality of retainer clips on said second mounting bracket further comprising:
   a plurality of fixed retainer clips extending from said second flat plate and outward from said back side of said second flat plate; and
   an attachment tab pivotably mounted to at least one of said fixed retainer clips on said second mounting bracket.

4. The modular voice amplification system of claim 1, further comprising a battery compartment extending below and outward from a bottom of said back cover of said voice amplifier module.

5. The modular voice amplification system of claim 1, further comprising a speaker positioned within said voice amplifier module and in electrical communication with said at least one electrical connector.

6. The modular voice amplification system of claim 5, wherein said at least one electrical connector on said voice amplifier module is configured to electrically communicate said speaker to each of said male electrical plug on said first mounting bracket and said electrical connector extending from said second mounting bracket.

7. The modular voice amplification system of claim 6, wherein said male electrical plug on said first mounting bracket is configured for electrical attachment to an electrical outlet on a mouthpiece of a protective mask on which said system is mounted.

8. The modular voice amplification system of claim 7, wherein said electrical outlet is further configured to electrically communicate said speaker with communication electronics within said protective mask.

9. The modular voice amplification system of claim 6, wherein said electrical connector extending from said second mounting bracket is configured for electrical attachment to an electrical outlet on a protective mask on which said system is mounted, wherein said electrical outlet is positioned outside of a mouthpiece on said protective mask.

10. The modular voice amplification system of claim 9, where said electrical outlet is further configured to electrically communicate said speaker with communication electronics within said protective mask.

11. The modular voice amplification system of claim 5, further comprising a processor within said voice amplifier module and in electrical communication with said speaker and said at least one electrical connector on said voice amplifier module.

12. The modular voice amplification system of claim 11, wherein said processor is configured to provide wireless communication from said modular voice amplification system.

13. The modular voice amplification system of claim 12, wherein said processor is further configured to provide push-to-talk communication from said modular voice amplification system.

14. The modular voice amplification system of claim 1, further comprising a manually engageable, pivotably mounted rocker arm extending from a front side of said voice amplifier module and attached to at least one of said retainer clips.

15. The modular voice amplification system of claim 14, wherein said rocker arm is configured to move said at least one of said retainer clips into and out of engagement with said exterior rim of said mouthpiece of said protective mask.

* * * * *